3,085,113
METHOD OF PREPARING NITROPHENETOLES
William S. Knowles, Kirkwood, and Alfred E. Lippmann, Crestwood, Mo., assignors to Monsanto Chemical Company, St. Louis, Mo., a corporation of Delaware
No Drawing. Filed May 10, 1961, Ser. No. 108,984
6 Claims. (Cl. 260—612)

This invention relates to an improved method for the preparation of nitrophenetole. More particularly, this invention is concerned with such a method as it pertains to the preparation of o- and p-nitrophenetole.

It is a primary object of this invention to provide an improvement in the reaction of a nitrochlorobenzene with sodium hydroxide and ethanol whereby the desired nitrophenetole is obtained in significantly increased yields.

Another object of this invention is to provide an improved method for the preparation of a nitrophenetole wherein the needed quantity of reactants, such as sodium hydroxide and ethanol, is materially reduced. For example, the amount of sodium hydroxide employed in the method of this invention is as much as 35% less than the amount employed in the methods of the prior art.

Still another object of this invention is to provide a method for preparing a nitrophenetole wherein the reaction time is reduced to afford a substantial savings from a commercial standpoint.

Still other objects, advantages and features of this invention will become apparent to those skilled in the art upon consideration of the following detailed description and the examples attendant thereto.

It has been found that the objects of this invention are achieved by reacting nitrochlorobenzene, sodium hydroxide and ethanol to incomplete or partial conversion. The reaction mixture is then vacuum topped whereby unreacted nitrochlorobenzene and a small amount of phenetole are removed. The nitrochlorobenzene and phenetole values are recovered from the toppings thereby providing the desirable economic features detailed below. The term "recovered," as employed herein, means that the topped nitrochlorobenzene and phenetole are reused so that credit therefore can be accorded in yield determination. Said reuse can be by feeding said toppings to another reactor and adding such other reactants as are necessary to prepare another batch of phenetole. Alternatively, said toppings can be stored for future use, or they can be separated into the aforesaid components and the latter put to separate uses.

The effectiveness of this vacuum topping and recovery procedure is evidenced by the ensuing specific examples wherein parts referred to are parts by weight. It should be understood that such examples are for the purpose of illustration only, and are not to be construed as limiting the scope of this invention.

EXAMPLE I

A reaction vessel is charged with 123 parts of p-nitrochlorobenzene (PNCB), 127 parts of 95% ethanol and 0.12 part of sodium silicate. The latter component serves to scavenge iron compounds which are inherently present due to the nature of the reaction vessel. Said vessel is pressurized to 30 lbs./sq. in. with air enriched with oxygen (to maintain off-gas oxygen concentration at 20%) pumped in throughout the reaction at a rate of 0.67 cu. ft./min. Agitation is started, and the resultant mixture is heated to 85° C. There is then added 173 parts of a caustic solution containing 33 parts of sodium hydroxide in 95% ethanol. The solution is added over a 4 hour period in accordance with a predetermined titration schedule whereby the concentration of caustic in the mixture varies linearly from 0.25 mol per liter at the beginning of the reaction to 0.50 mol per liter at the end thereof.

After all of the solution has been added, the agitation and temperature are maintained for an additional 3 hours to permit all of the caustic to react. The reaction mixture is then filtered to remove sodium chloride, and any excess alcohol is stripped off and recovered. The oil which remains is washed free of salts and subjected to vacuum topping. The topping operation is carried out at 200° C./60 mm. whereby excess PNCB, and a small amount of the nitrophenetole, are stripped off by taking advantage of the difference in the vapor pressures of said PNCB and p-nitrophenetole. The bottoms contain 96 parts of p-nitrophenetole having a crystallization point of 57.5° C. The toppings consist of 18 parts of PNCB and 6 parts of p-nitrophenetole. Where the topping operation is carried out at 85% conversion of the starting PNCB, the recovery of the PNCB and phenetole values in said toppings provide a very significant improvement in yield as indicated by the following comparison.

| Reactants | Percent of theory yields (98% conversion) | Percent of theory yields (85% conversion and recovery) |
|---|---|---|
| PNCB | 86 | 92 |
| Sodium hydroxide | 54 | 73 |
| Ethanol | 56 | 64 |

EXAMPLE II

The procedure of Example I is repeated employing the same stoichiometric proportions of PNCB, sodium hydroxide and ethanol except that 202 parts of caustic solution containing 36.3 parts of sodium hydroxide in 95% ethanol is used. The reaction is permitted to go to 90% conversion before the vacuum topping operation. The values recovered from the toppings are 11 parts of PNCB and 4 parts of p-nitrophenetole. The improvement in yields is reflected in the following comparison.

| Reactants | Percent of theory yields (98% conversion) | Percent of theory yields (90% conversion and recovery) |
|---|---|---|
| PNCB | 86 | 91 |
| Sodium hydroxide | 54 | 70 |
| Ethanol | 56 | 62 |

EXAMPLE III

Again following the procedure of Example I, 170 parts of caustic solution containing 30.5 parts of sodium hydroxide in 95% ethanol is used. The reaction is permitted to go to 80% conversion before the vacuum topping operation. The bottoms consist of 89 parts of p-nitrophenetole, and the values recovered from the toppings are 25 parts of PNCB and 8 parts of p-nitrophenetole.

The improvement in yields is reflected in the following comparison.

| Reactants | Percent of theory yields (98% conversion) | Percent of theory yields (80% conversion and recovery) |
|---|---|---|
| PNCB | 86 | 93 |
| Sodium hydroxide | 54 | 76 |
| Ethanol | 56 | 65 |

EXAMPLE IV

Following the procedure of Example I, 147 parts of caustic solution containing 26.4 parts of sodium hydroxide in 95% ethanol is employed. The reaction is permitted to go to 70% conversion before the vacuum topping operation. The bottoms consist of 74 grams of p-nitro-phenetole, and the values recovered from the toppings are 37 parts of PNCB and 12 parts of p-nitrophenetole. The improvement in yields is reflected in the following comparison.

| Reactants | Percent of theory yields (98% conversion) | Percent of theory yields (80% conversion and recovery) |
|---|---|---|
| PNCB | 86 | 94 |
| Sodium hydroxide | 54 | 78 |
| Ethanol | 56 | 68 |

EXAMPLE V

A reaction vessel is charged with 123 parts of o-nitrochlorobenzene (ONCB), 154 parts of 95% ethanol and 0.12 part of sodium silicate. The vessel is then pressurized, and agitation and heating are applied as in Example I. There is added 174 parts of caustic solution containing 34.2 parts of sodium hydroxide in 95% ethanol. The solution is added over a period of 4 hours in accordance with a schedule as described in Example I.

The reaction is permitted to continue for another 3 hours at which time the conversion is 85% relative to the starting ONCB. The reaction mixture is worked up and vacuum topped as described in Example I. The toppings values are 90% ONCB and 10% o-nitrophenetole. The following comparison indicates the improvement in yields, such improvement being even more significant when it is recognized that 98% conversion requires 18 hours while the partial conversion of this invention requires only 10 hours.

| Reactants | Percent of theory yields (98% conversion) | Percent of theory yields (85% conversion and recovery) |
|---|---|---|
| ONCB | 80 | 93 |
| Sodium hydroxide | 50 | 70 |
| Ethanol | 56 | 74 |

In order to further and more completely illustrate the increased yield and time saving features of this invention, the table which follows incorporates such data for Examples I through V. The figures presented clearly demonstrate the substantial economic advantages achieved by the practice of this invention as opposed to results obtained by conventional methods of preparing phenetole.

Table I

| Conversion | Percent PNCB | Percent ONCB | Percent NaOH | Percent $C_2H_5OH$ | Reaction Time (hrs.) | Values Recovered |
|---|---|---|---|---|---|---|
| 98% PNP [1] | 85 |  | 54 | 56 | 14.5 | No. |
| 98% ONP [2] |  | 80 | 50 | 56 | 18.0 | No. |
| 90% PNP | 91 |  | 70 | 62 | 8.5 | Yes. |
| 85% PNP | 92 |  | 73 | 64 | 7.0 | Yes. |
| 80% PNP | 93 |  | 76 | 65 | 6.0 | Yes. |
| 70% PNP | 94 |  | 78 | 68 | 4.5 | Yes. |
| 85% ONP |  | 93 | 70 | 74 | 10.0 | Yes. |

[1] p-Nitrophenetole.
[2] o-Nitrophenetole.

In general the vacuum topping and value recovery steps of this invention provide the above desirable features when carried out at conversions up to about 90%. Although said steps can be employed at conversions as low as about 60%, it has been found more efficient and practical to practice this invention at not less than about 70% conversion due to distillation problems. The temperature during the vacuum topping operation can vary from about 180° C. to about 200° C. depending upon the reduced pressure employed. Such pressure can vary from about 60 to 20 mm. or less.

It will be recognized that the above examples are illustrative only, and numerous variations can be made by those skilled in the art without departing from the spirit and scope of this invention.

This application is a continuation-in-part of copending application Serial No. 735,672, filed May 16, 1958, and now abandoned.

The embodiments of the invention in which an exclusive property or privilege is claimed are defined as follows:

1. In a method of preparing a nitrophenetole selected from the class consisting of o-nitrophenetole and p-nitrophenetole by reacting a mixture of nitrochlorobenzene, sodium hydroxide and ethanol, the improvement of causing the reaction to go to partial conversion of from about 60 to 90 percent, vacuum topping the reaction mixture at a temperature of from about 180° C. to 200° C., and recovering the nitrochlorobenzene and nitrophenetole values from the toppings.

2. A method as defined in claim 1 wherein the partial conversion is about 85 percent.

3. A method as defined in claim 1 wherein the vacuum topping is carried out at from about 20 to 60 mm.

4. A method as defined in claim 1 wherein the nitrophenetole is p-nitrophenetole and the nitrochlorobenzene is p-nitrochlorobenzene.

5. A method as defined in claim 1 wherein the nitrophenetole is o-nitrophenetole and the nitrochlorobenzene is o-nitrochlorobenzene.

6. In a method of preparing a nitrophenetole selected from the class consisting of o-nitrophenetole and p-nitrophenetole by reacting a mixture of nitrochlorobenzene, sodium hydroxide and ethanol, the improvement of causing the reaction to go to partial conversion of from about 70 to 90 percent, vacuum topping the reaction mixture at a temperature of about 200° C., and recovering the nitrochlorobenzene and nitrophenetole values from the toppings.

No references cited.